United States Patent [19]
Carlson

[11] Patent Number: 5,531,970
[45] Date of Patent: *Jul. 2, 1996

[54] METAL AND FLUORINE VALUES RECOVERY FROM MINERAL ORE TREATMENT

[75] Inventor: Bryan J. Carlson, Little River, S.C.

[73] Assignee: Advanced Recovery Systems, Inc., Erwin, Tenn.

[*] Notice: The term of this patent shall not extend beyond the expiration date of Pat. Nos. 5,273,725 & 5,384,105.

[21] Appl. No.: 429,341

[22] Filed: Apr. 26, 1995

Related U.S. Application Data

[63] Continuation-in-part of Ser. No. 341,020, Nov. 17, 1994, abandoned, and a continuation-in-part of Ser. No. 153,820, Nov. 15, 1993, Pat. No. 5,384,105, and a continuation-in-part of Ser. No. 891,167, May 29, 1992, Pat. No. 5,273,725.

[51] Int. Cl.⁶ .................................................. C01G 33/00
[52] U.S. Cl. .................. 423/3; 423/11; 423/122
[58] Field of Search ................... 423/3, 11, 122

[56] References Cited

U.S. PATENT DOCUMENTS

| | | | |
|---|---|---|---|
| 5,273,725 | 12/1993 | Carlson | 423/11 |
| 5,384,105 | 1/1995 | Carlson | 423/65 |

*Primary Examiner*—Donald P. Walsh
*Assistant Examiner*—Anthony R. Chi

[57] ABSTRACT

The process for separating U or Th values from values of at least one other metal such as Ta, Nb, Sc, Zr, Ti or Mg, wherein all of the values are contained in a difficult soluble matrix of highly fluorinated feed materials such as U or Th bearing ores or the processing products, processing intermediates, or processing residues thereof, the method comprising the steps of:

(a) digesting the feed materials with an aqueous, mineral acid, digest medium containing one or more complexing materials such as $H_3BO_3$, or ions of group 2A, 3A, 4A, 5A, 6A, or 7A metals, Fe, B, Al or Si;

(b) maintaining the temperature of the medium between about 55° C. and about 85° C.;

(c) reacting the materials in the medium for a sufficient period to solubilize essentially all of the U and Th values;

(d) separating any remaining solids from the medium to provide an aqueous, acidic digest liquor containing the solubilized U or Th values and any solubilized other metal values;

(e) intimately contacting the liquor with an organic phase to transport thereinto substantially all of the U or Th values and any of the solubilized other metal values which are extracted by the organic phase from the liquor; and (f) separating the organic phase containing at least the U or Th values from the liquor containing any of the solubilized other metal values which were not extracted into the organic phase to form a substantially non-radioactive, aqueous, acidic raffinate containing the solubilized non-extracted other metal values.

23 Claims, 3 Drawing Sheets

METAL AND FLUORINE VALUES RECOVERY FROM MINERAL ORE TREATMENT

FIELD OF THE INVENTION

This application is a Continuation-in-Part of applicant's Ser. No. 07/891,167, now U.S. Pat. No. 5,273,725 and of Ser. No. 08/153,820, now U.S. Pat. No. 5,384,105 and of Ser. No. 08/341,020 filed Nov. 17, 1994, now abandoned, and the invention concerns the processing of various mineral-containing materials, i.e., mineral ores or the processing products, intermediates, residues or tailings thereof such as relatively insoluble residues or the solubilized raffinate or waste streams or the like generated during the production of metals or non-metals from their ores. The invention particularly concerns the processing of such materials in the form of matrices which are difficult to solubilize and contain relatively substantial radionuclide values and fluorine values essentially entrapped therein. The present processing, in one primary embodiment, is intended to diminish markedly the radioactivity levels in useful non-radionuclide product or in final discard derived from the present processing, which product can meet chemical landfill quality standards, i.e., non-hazardous status. The present invention is especially adapted to isolate fluorine values, e.g., as fluoride values, and radionuclide values for recovery, and is particularly suited to the efficient treatment of calcium fluoride sediments derived from ore treatment tailings or wastes which have received one or more HF digestions or other treatments followed by lime neutralization.

BACKGROUND OF THE INVENTION

The production of many metals or useful metal-containing compounds from ores, for example, tin from cassiterite, tantalum and niobium from tantalite/columbite ores, scandium from thortveitate, uranium from pitchblend or uraninite, and rare-earth elements from monazite or bastnasite, typically employs at some point in the production process or in the treatment of tailings therefrom, a hydrofluoric acid digestion, leach or the like. Such treatment is often necessary to convert the myriad of different components including insoluble minerals, metals or compounds thereof, including various radionuclides, such as their oxides, halides, carbonates, fluorides, phosphates, sulfates or the like to species which are soluble in aqueous systems such that they can be separated out by selective precipitations, extractions or the like. The insolubilities of these components are often magnified by the refractory or inaccessible crystalline nature or the material, i.e., the matrix in which these components are occluded, entrapped or chemically incorporated, thus necessitating the drastic and extensive HF treatment. Also, in many such processes, HF or other fluorine containing reactant is employed for converting one species to another, such as the conversion of various oxides of uranium to the highly soluble $UF_6$. The result of these HF treatments is that somewhere in the processing operations, whether primary ore manufacture or tailings processing or the like, the massive and extremely deleterious HF levels must be neutralized, typically and conveniently with lime. Such neutralization, of course, produces large quantities of insoluble calcium fluoride waste sediment or sludge which either physically entraps or chemically incorporates into its crystal lattice residual but significant quantities of valuable metals including radionuclides such as uranium and thorium, as well as bringing down large valuable fluorine values. The typical fluorine values of these sediments by weight, dry basis, are from about 35% to about 45%, and for each of uranium, thorium, tantalum, and niobium about 0.1%. Greater or lesser concentrations of these elements, or different metal species may be found depending on the type of metal ore and processing operation involved. It is noted that the quantities of HF needed in various ore treatment operations around the world is enormous as well as expensive, and thus, fluorine values recovery is a very important consideration in any process directed to the treatment of ore, per se, or of ore processing tailings or waste material or streams.

In this regard many ores, per se, depending on their geographical sources, as well as the residual wastes from their processing into metals or compounds thereof naturally contain substantial fluorine values, for example, fluorite, cryolite, fluorapatite, sellalite, topaz, villiaumite and bastnasite contain fluorine values ranging up to about 50% by weight, and often contain substantial radionuclide values. It is noted that in many instances the initial ore may contain only relatively low concentrations of radionuclide materials but during processing of the ore by flotation, sedimentation, extraction, chemical precipitation, evaporation or the like operations, the level of radionuclide materials and also of fluorine values can become concentrated and raised substantially, e.g., assaying at least above about 30 pCi/g, and often much higher.

In recovering the various metal and non-metal components or values therefrom, the ore is typically digested in an acid such as $H_2SO_4$, HCl, $HNO_3$ or even HF and substantial fluorine values are liberated, usually as HF. Thus, the recovery of these fluorine values becomes an important consideration whether the values are naturally occurring in the ore or are man-made; but, incident thereto, a two-fold problem, discussed in detail below, exist. These problems which are associated with ore processing waste treatment operations derive from the fact that the fluorine values must be recovered in an economical manner while concurrently reducing the radionuclide levels therein and in final residue or discard to chemical landfill quality, and also, preferably while recovering the radionuclide values, particularly uranium as well as other metal values such as Mg which may be employed in the recovery operations.

For the ore treatment scenario discussed above, certain valuable metal ores come into the production plant with substantial radionuclide values, for example tantalum and niobium-bearing materials may contain up to about 1.0% by weight uranium and thorium, with associated daughter products in equilibrium. When the ores are digested, for example, with HF, the various radionuclide values typically do not mobilize into the liquor in an efficient and consistent manner. Therefore, the final ore processing residues or tailings contain substantial quantities of uranium and thorium as insoluble fluorides, and other insoluble metal fluorides such as scandium. The relatively high radionuclide content creates a large problem to the disposal of such residues in that their classification according to Federal Regulations is not chemical waste but hazardous nuclear waste. Typcially, the fluoride content in the aforementioned ore residues can range up to about 30% by weight or higher. Other typical metals which are present in the residues include: calcium, 15%, aluminum, 5%; zirconium, 2%; tantalum, 1.2%; niobium, 1.7%; and scandium, 0.15%, the percentages being on dry basis. These fluoride-bearing ore residues which often having radioactivity levels of well above 30 pCi/g, are usually impounded at the plant site until a determination can be made concerning their disposition.

As mentioned above and as is discussed hereinafter in greater detail, the relatively insoluble mineral fluoride matrices resulting from the treatment of ore residues and sediments described above typically have been treated heretofore with sulfuric acid at elevated temperatures. In this process, hydrofluoric acid is formed and liberated. With the fluoride removed as HF, the various metals within the matrix are converted to soluble sulfates which can then be dissolved in an aqueous solution and removed by extraction, precipitation, or other techniques. The purpose of such metal recovery is to generate revenue, e.g., from scandium, yttrium, or other valuable metals or to decontaminate solids, i.e., remove uranium, thorium or radium to obviate the premium charged for radioactive waste disposal.

Discussion of The Prior Art

Heretofore, an integrated system dedicated to solving the aforestated two-fold problem has not been directly addressed as will become evident from the following discussion concerning specific prior processing systems for ore or for ore waste or tailings.

In U.S. Pat. No. 5,023,059 a process is disclosed for the recovery of metal values such as columbium (Nb), tantalum, thorium and uranium. The recovery of the Ta, Nb metal values is the first step of the process and a digestion of the sludge is made with HF to isolate the Ta, Nb values in a liquid stream from insoluble digest residues which contain the U, Th and other metal values. Consequently, the digest residue, as mentioned above, is roasted with $H_2SO_4$ to solubilize the U and Th values. This roasting also releases gaseous HF which must be handled quickly, with great care and at great expense. Also, experience has shown that for refractory $CaF_2$ type matrices, the $H_2SO_4$ treatment typically leaves substantial uranium and/or other radionuclide values in the digest residue. It becomes apparent therefore, that the principal objectives of this prior procedure are quite different from applicant's and, as will become more evident hereinafter, necessitate the use of procedures and steps such as the onerous HF recovery which applicant's novel process has obviated.

In U.S. Pat. No. 5,084,253 the metal niobium is separated from uranium by means of a mineral acid digestion of an alloy of the metals, wherein fluoroboric acid is added to facilitate $U^{+4}$ production using lower concentrations of HCl. After the insoluble niobium oxides have been separated from the digest liquor, the $U^{+4}$ ion is precipitated with HF to give the insoluble $UF_4$ green cake. This process does not have to be concerned with the problems associated with a substantially concurrent recovery of uranium and fluorine values from a common waste material or ore source, and thus, can accommodate the green cake formation. It is particularly noted that the process of this patent takes measures to avoid the formation of the uranyl ion, the presence of which as will be seen hereinafter, is important to Applicant's process.

Principal objects, therefore, of the present invention are to provide a markedly simplified process for the recovery of substantial fluorine and radionuclide values, particularly uranium and thorium values, from ore leach residues or the like, wherein the need for handling gaseous HF is obviated and wherein substantially all of said values are substantially concurrently released to the digest liquor; to provide such process which is exceptionally efficient in removing radionuclide values from ore processing waste material such that chemical waste rather than nuclear waste status is achieved for the final discard; to provide such process which readily provides a feed material of high fluorine content and very low radionuclide content for conversion of the fluorine to non-gaseous, purified chemical intermediate materials; and to provide an improved process for the production of $AlF_3$ from fluorine containing ores or their processing tailings or wastes.

Summary Of The Invention

These and other objects hereinafter appearing have been attained in accordance with the present invention which, in a principal embodiment, is defined as a process for converting feed materials of high mineral content and substantial radioactivity levels to concentrated radionuclide products of high radioactivity levels and to other products or discard of very low radioactivity levels, wherein said feed materials contain substantial fluorine values and radionuclide values assaying above about 30 pCi/g, said process comprising contacting said feed materials with an acidic aqueous digest medium containing one or more complexed materials selected from the group consisting of boric acid, or ions of group 2A, 3A, 4A, 5A, 6A, or 7A metals, Fe, B, Al, or Si, and an acid component comprising one or more other mineral acids, the ratio of said medium (L) to said feed materials (Kg) on dry basis ranging from about 1/1 to about 20/1, preferably from about 2/1 to about 6/1, the total combined concentrations of all of said complexing materials and acid component being sufficient to solubilize said values at commercially acceptable rates, the molar ratio of said acid component to said complexing materials charged to or formed in-situ in said digest medium being from about 20 to about 0.5, said contacting being carried out for a period of time sufficient to solubilize said values into a digest liquor, separating said radionuclide values from said digest liquor to give concentrated, substantially purified radionuclide values, and contacting the resulting first raffinate liquor with carton reactant to form and precipitate fluoride salt product, said salt product, the resulting second raffinate liquor, and said first raffinate liquor each having a radionuclide values assay of less than about 20% of the radioactivity level of said feed material.

The metal groups listed above are identified in the Periodic Table Of The Elements found on page 433 of Grant & Hackh's Chemical Dictionary, Fifth Edition. The various metals of the complexing materials may be entered into the acidic digest medium in finely divided elemental form and therein oxidized by the mineral acids, or as compounds such as, e.g., $Al(NO_3)_3$, $Al_2O_3 \cdot 3H_2O$, $Fe(NO_3)_3$, or $FeCl_3$. In general, the acid salt or soluble oxide forms of the metals are preferred.

In certain preferred embodiments:

(1) said feed materials comprise ore leach residues containing substantial calcium fluoride materials, the said acid component contains sulfuric acid in sufficient quantities to precipitate substantially all calcium ions as digest residue, wherein said digest liquor is separated from said residue, and wherein said residue has a radionuclide values assay of less than about 30 p Ci/g;

(2) said feed materials contain substantial metal fluoride values, wherein said acid component comprises one or both of nitric acid and hydrochloric acid and wherein said first raffinate liquor is contacted with sulfuric acid to form and precipitate metal sulfates having a radionuclide values assay of less than about 30 p Ci/g;

(3) the metals of said sulfates of (2) above comprise at least calcium, zirconium, iron and manganese;

(4) the molarity of each of said complexing materials and said acid component is above about 0.5, and the aqueous system is heated to a temperature of from about 75° C. to about 100° C. for a period of from about 0.5 to about 10.0 hours;

(5) the complexing materials comprise boric acid and the molarity of said acid component is higher than the molarity of said boric acid;

(6) the said feed materials are redigested one or more times in fresh acidic aqueous systems to solubilize the more intractable values;

(7) the initial molar ratio of other mineral acid to the complexing materials charged to said acidic aqueous system is from about 1.0 to about 10;

(8) the solubilized uranium values are separated from said digest liquor by passing said liquor through a chelating ion exchange column;

(9) the process of above embodiment (1) wherein said feed materials contain significant tantalum and/or niobium values, the said digest medium contains sulfuric acid/complexing materials in sufficient quantities to produce a residue concentrated in tantalum and niobium values, and wherein the residue contains reduced radionuclide values, most notably uranium and thorium; and

(10) the process for separating primary values of Ta and Nb from at least one of secondary values of U or Th, and from one or more secondary values selected from the group consisting of Sc, Zr, Ti or other values of non-radioactive metals, all of the aforesaid values being contained in highly fluorinated ore feed materials said process comprising:

(a) contacting said feed materials with an aqueous, acidic digest medium containing one or more complexing materials selected from the group consisting of $H_3BO_3$ or ions of group 2A, 3A, 4A, 5A, 6A, or 7A metals, Fe, B, Al or Si, and an acid component comprising $H_2SO_4$, $HNO_3$ or HCl or mixtures thereof, wherein the molar ratio of the complexing materials to said acid component is from about 1/10 to about 1/1, wherein the ratio of said reaction medium in liters (L) to said feed materials (Kg) on dry basis ranges from about 1/1 to about 20/1, the total concentrations of all of said acids being sufficient to solubilize said values at commercially acceptable rates, and wherein the molar ratio of said acid component to said complexing materials charged to said medium ranges from about 20 to about 0.5;

(b) maintaining the temperature of said medium between about 55° C. and about 85° C.;

(c) reacting said materials with said medium for a sufficient period to solubilize the major portion of said secondary values and to leave said Ta or Nb values substantially insolubilized in said medium;

(d) separating the solids containing said Ta or Nb values from said medium to provide a digest liquor containing said solubilized secondary values;

(e) intimately contacting said liquor with an organic phase to transport at least major portions of said U and Th values thereinto from said liquor; and (f) separating said organic phase from said liquor to form a substantially non-radioactive raffinate.

BRIEF DESCRIPTION OF THE DRAWINGS

The invention will be further understood from the drawings herein, wherein.

DETAILED DESCRIPTION OF THE INVENTION

Figure 1:
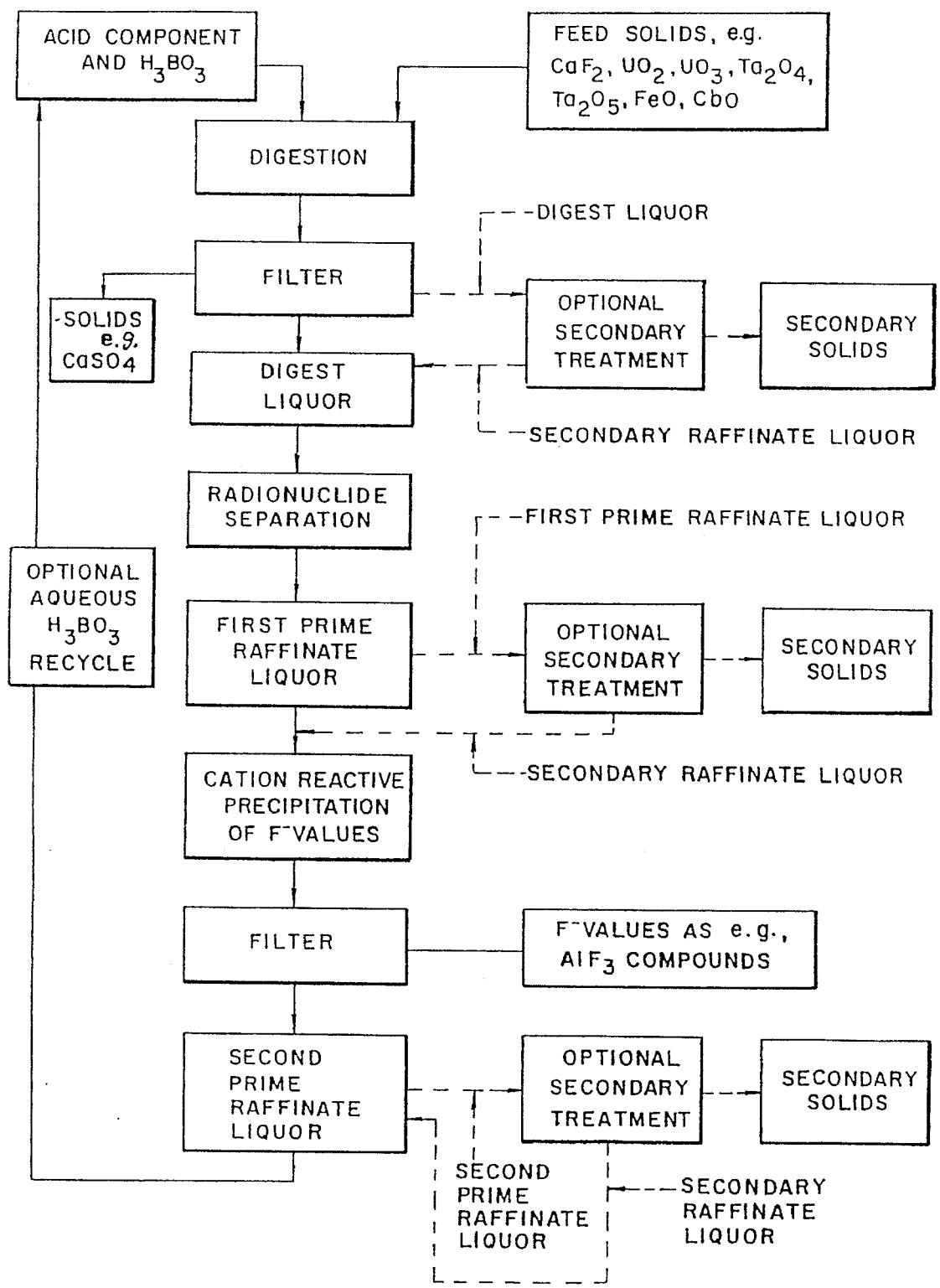
FIG. 1 is a schematic flowsheet for the present overall process wherein $H_3BO_3$ is used as the exemplary complexing material.

As indicated above, the invention concerns a process especially suited for removing valuable metal, fluoride, and radionuclide values from a feed material of high mineral content in which the metals and radionuclides are present as substantially water insoluble fluorides or are trapped within a metal fluorine matrix which is substantially insoluble in chemical reactant systems. FIG. 1 is a basic, greatly simplified, but entirely operable schematic for the present overall process in one of its preferred embodiments. The process as shown in FIG. 1 comprises a mineral acid/boric acid leach or digestion wherein at least the fluorides and radionuclides are placed in solution in a digest medium, a filtration system for removing any remaining insoluble material, a separation step where solubilized metal values, radionuclide values, and contaminants are removed by specific extraction, precipitation, ion-exchange, or the like procedures, and a basic digest of the first raffinate liquor wherein the fluorine values are converted to fluoride product precipitate, a filtration system for recovery of said fluoride product, and if desired recycle of the second raffinate liquor containing recycle $H_3BO_3$ back to the digest medium.

The present process can be applied to the efficient recovery of strategic metals including, but not limited to, transition, lanthanide, and actinide series metals from metalfluoride matrices. Examples of these matrices include calcium fluoride sediments from wastewater treatment operations or from leach ore residues which contain calcium aluminum fluoride materials from primary metal production operations. The focus of the present invention is on the leaching or dissolution reaction in which the feed materials are reacted with chemical reagents under controlled conditions of time and temperature. These chemical reagents are selected to enhance the effective dissolution of the matrix directed to optimizing the release of certain metal species and providing a resulting liquor that may be treated for the efficient recovery of metal values and fluoride or fluorine values.

Typically in the past, metal-bearing fluoride compounds resulting from residues and sediments described above have been treated with mineral acids such as $H_2SO_4$, at high temperatures to dissolve or mobilize metals existing as insoluble metal-fluorides. Recovery of these metals is desirable for revenue value or for the purpose of decontaminating solids, i.e., the removal of uranium and thorium, in order to eliminate the premium charged for radioactive waste disposal. For example, when calcium fluoride sediments are reacted with sulfuric acid, a calcium sulfate (gypsum) material and a metal-rich $HF/H_2SO_4$ liquor are produced. The liquor is first separated from the solids and then processed to extract the metal species. The resulting residual solids are evaluated for chemical content and either redigested to remove addition metal species or discarded. Typically, such a digestion leaves considerable radionuclide values in the residual solids.

The present process, in a preferred embodiment, uses boric acid as a strong complexing agent in a sulfuric acid leaching system for the digestion of a metal fluoride matrix. Preferably stoichiometric amounts of sulfuric and an excess of boric acid contact the metal fluoride matrix within fairly wide ranges of temperature and reaction times. The boric acid apparently forms a very stable complex with the fluorine in the matrix during the digest or leaching reaction, for example, with calcium fluoride according to the reaction.

(1) $H_2O + 2CaF_2 + H_3BO_3 + 2H_2SO_4 \rightarrow 2CaSO_4 \cdot 2H_2O + HBF_4$.

Figure 3:
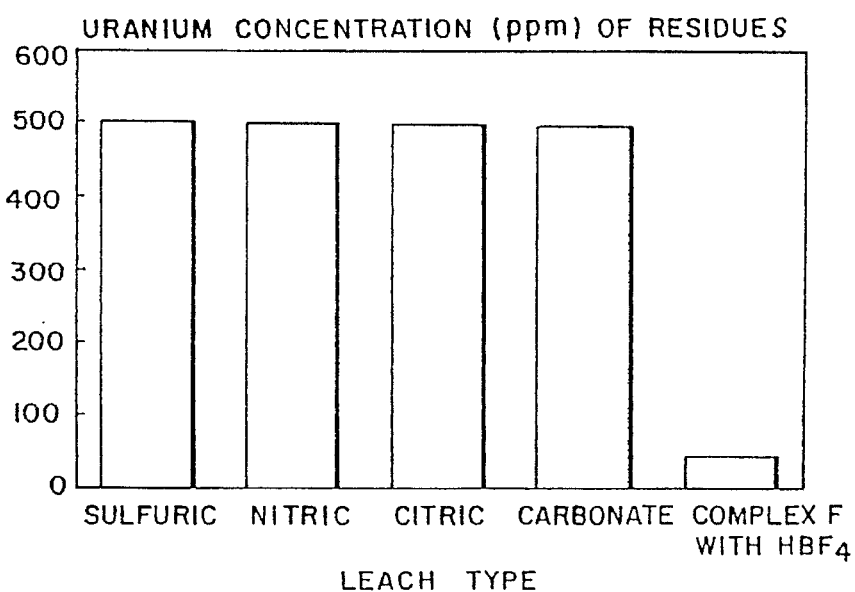
FIG. 3 is a graph which compares the uranium values leaching effectiveness of various digest agents versus the present mineral acid/boric acid, digest medium.
Figure 4:
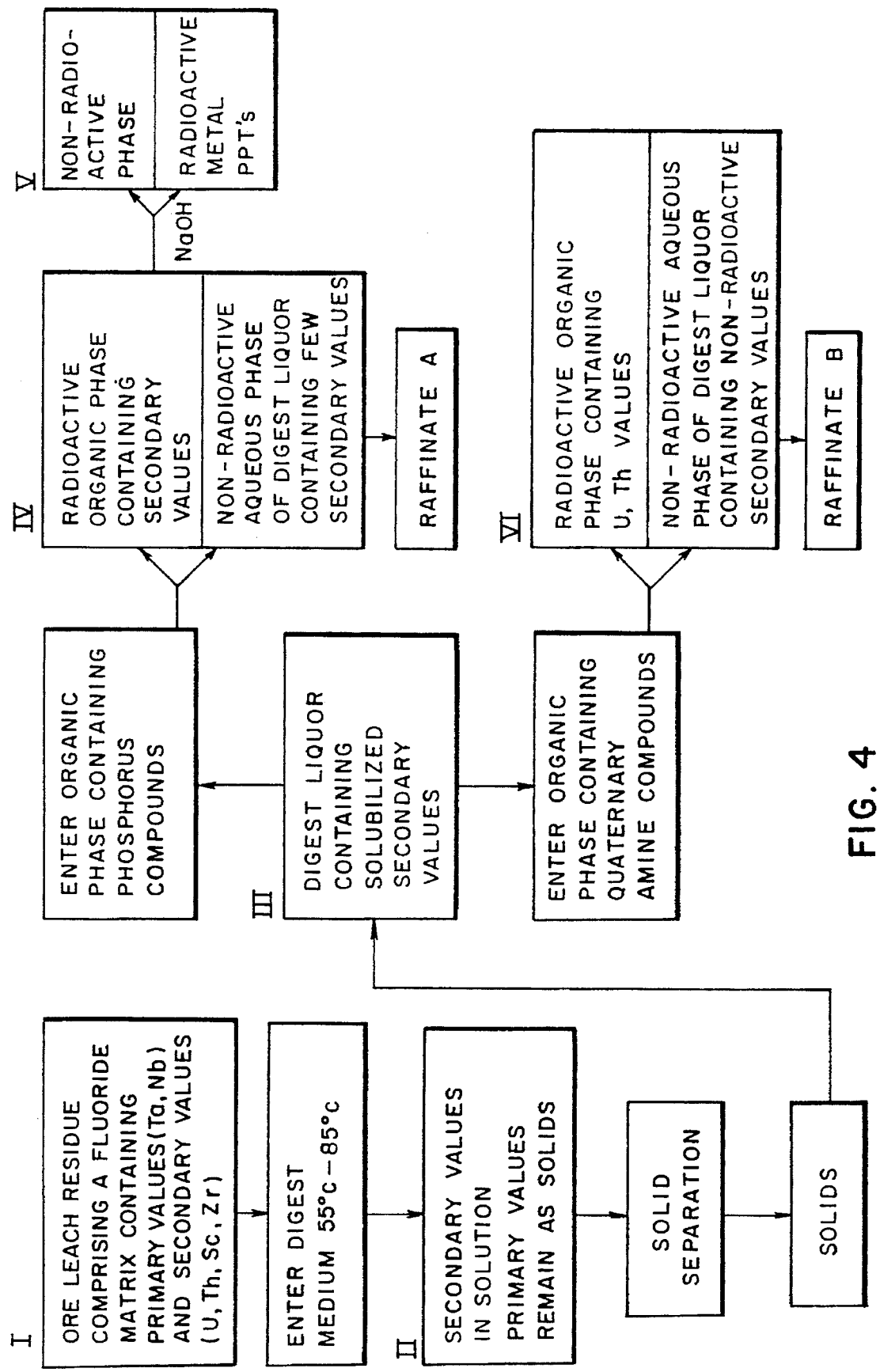
FIG. 4 is a flow sheet of two alternative extraction procedures for the present invention.

FIG. 3 hereof provides a comparison of leaching efficiencies for various chemical reagents alone versus the present complexation with boric acid, particularly, $H_2SO_4/H_3BO_3$.

After the desired metals are extracted from the resulting $HBF_4$ containing liquor, particularly the radionuclides, e.g. using ion-exchange, solvent extraction, or selective precipitation, the resultant raffinate liquor may then be treated to recover fluorine values. This can be achieved, for example, by the preferred end reaction.

(2) $12H_2O + 3(NH_4)BF_4 + 4Al(OH)_3 \rightarrow 4(AlF_3 \cdot 3H_2O) + H_3BO_3 + 3NH_4OH$, or by the end reaction (3) $3HBF_4 + Al_2O_3 3H_2O + 3Na_2CO_3 \rightarrow 2AlF_3 \cdot 3NaF + H_3BO_3 + 3CO_2$ which forms cryolite, a major feed material used in the manufacture of aluminum. Other aluminum fluoride salts, or the $AlF_3$ may be formed by similar reactions, e.g., by the reaction with $Al_2(SO_4)_3$.

With respect to the digest process, several factors influence the choice of the mineral acid, including the chemical composition of materials to be leached, the type of separation system to be used to remove metal values or contaminants from the leach liquor, and values recovery cost. In this regard, the mineral acid must form soluble salts with the components of interest and be compatible with the extraction or other separation system of choice. For example, sulfuric acid is typically used if uranium is the component of interest because it forms a soluble salt, is low in cost, and is compatible with several extraction techniques. If radium is the component of interest, radium forms insoluble sulfate salts, and therefore, hydrochloric or nitric acid would be the mineral acid of choice.

The amounts of mineral acid and complexing material, e.g., boric acid will vary with the feed composition. The mineral acid is typically added in sufficient excess to transmute to soluble species any hydroxides or carbonates present in the mineral feed material, to achieve an acid molarity of at least about one normal, and to neutralize hydroxyl ions formed from the complexation reaction of the fluoride species with the boric acid. The complexation reaction proceeds according to the equation, $H_2O + 2CaF_2 + H_3BO_3 + 2H_2SO_4 \rightarrow HBF_4 + 2CaSO_4 \cdot 2H_2O$.

A 25–50% excess of the stoichiometric amounts of boric acid required to complex the fluoride in the mineral material preferably is used and sufficient water is added to maintain the boric acid concentration in the one molar range. A pH<1 is preferred for this reaction. This preferred molarity is based on the solubility of boric acid at room temperature. Less water can be utilized if sufficient temperatures are maintained throughout the process to maintain the boric acid in solution.

The mineral materials feed is typically leached for two to four hours at about 80°–95° C., although temperatures of from about 60° C. or lower, to about 115° C. or higher are useful. Dependent on the feed material composition, leaching times of up to twelve or more hours may be required, and for particularly refractory materials, multiple leaches may be expedient.

Following the leaching or digestion process, the leach liquor is filtered to remove any insoluble components. The solids are washed with water or with acidified water to remove any residual mineral acid and boric acid or other complexing material from the filter cake. The wash is combined with the filtrate and the liquor is sent to one or more separation operations for the selective removal of metal values or contaminants. The types of separation operations employed will vary depending on the mineral feed material, the mineral acid and complexing materials used, and the metals or radionuclides to be recovered. However, in essentially all cases, an ammonium hydroxide precipitation of contaminant metals is preferred and is performed prior to the aluminum reactant digestion used for production of aluminum fluoride, as shown above.

Figure 2:
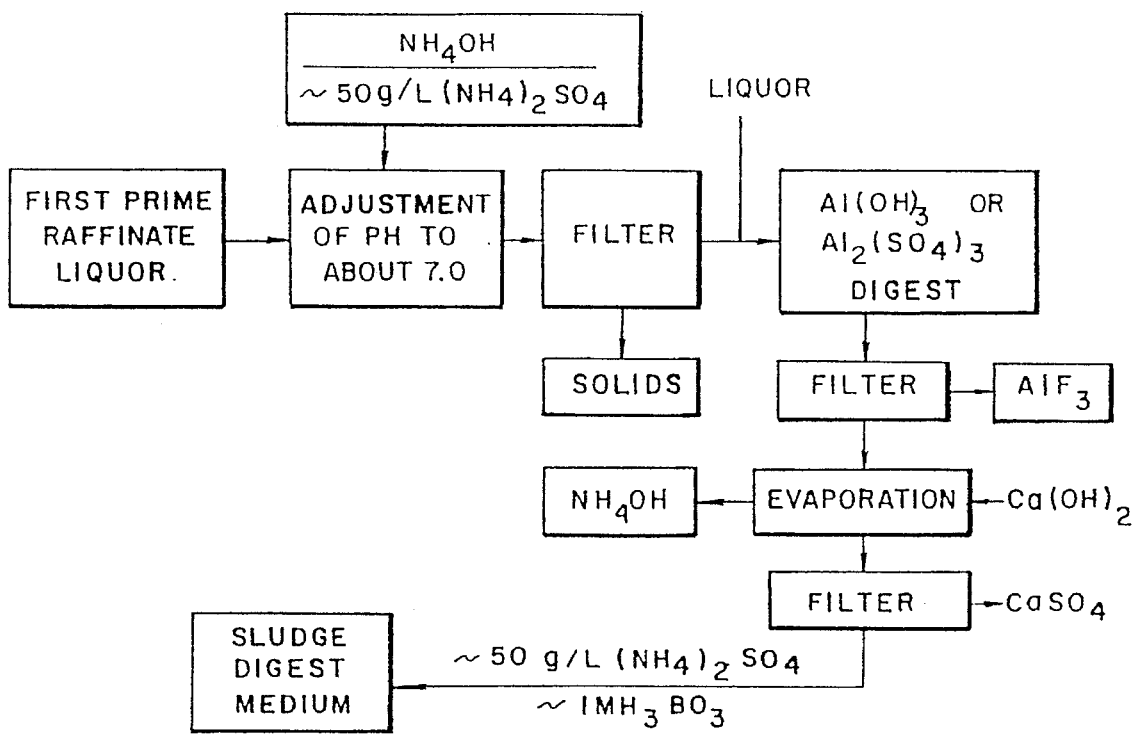
FIG. 2 is a schematic flowsheet of preferred embodiments of fluorine values recovery.

Following removal of metal contaminants, the process liquor, in one embodiment of $AlF_3$ production as shown in FIG. 2, is digested for 30 minutes to 1 hour with aluminum hydroxide under pressure, at about 150° C. The aluminum hydroxide is added as a solid at about 95% of the stoichiometric quantity required per the equation, $12H_2O + 4Al(OH)_3 + 3NH_4BF_4 \rightarrow 4AlF_3 \cdot 3H_2O + 3H_3BO_3 + 3NH_4OH$.

After digestion, the aluminum fluoride product is filtered, the filter cake is washed with water to remove residual ammonium salts and boric acid, the wash is combined with the filtrate, the resultant liquor is returned to the leaching process, and the aluminum fluoride filter cake is calcined at about 250° C. to remove the waters of hydration and provide a more acceptable product for sale.

The above FIG. 1 and 2 show the principal steps of digestion, radionuclide separation, and fluoride values recovery and their sequence in the present processes, and also indicate at what stage in the process the first, second, third, etc., raffinate liquors referred to in the claims occur. In this regard, the numerical designations of these raffinate liquors do not signify that they are the only raffinates that can and will be produced in carrying out the present process on a commercial basis and with commercial equipment. These designations do, however, represent principal stages which constitutes the present process. For example, formation of the first raffinate liquor, i.e., the solution remaining after separation of the radionuclides from the digest liquor can be preceeded by any number and composition of secondary raffinate liquors which may result from any number and types of secondary treatments of the digest liquor prior to the principal step of separating out said radionuclide values. Such secondary treatments, e.g., may comprise specific chemical precipitations, solvent extractions, aqueous or chemical washings, filtrations, centrifugations, settlings, or the like designed to remove specific elements compounds or impurities from the digest liquor. A specific example is the optional secondary removal of zirconium from the digest liquor by means of ammonium hydroxide precipitation prior to separation of the radionuclide materials from the liquor. Such a precipitation of zirconium compound would produce a secondary raffinate, however, the principal character of the digest liquor, i.e., as containing the principal fluorine and radionuclide values would not be altered and the designation of "first raffinate liquor" would still be viable since it resulted from digest liquor containing the said principal values of interest. This same analysis or characterization holds also for the other designated principal raffinates and the aforementioned secondary treatments may be employed, if desired, anywhere along the process, e.g., as preparatory to or subsequent to precipitation of fluoride salt product.

The various ores, per se, to which the present process is applicable include, for example, a typical tantalite ore which may contain from about 20% to about 50% tantalum and from about 1% to about 10% columbium, and a columbite ore which may contain from about 3% to about 20% tantalum and from about 10% to about 30% columbium. Eastern (Malaysian) tin slags may contain, e.g., 2% to 5% of each metal, while African tin slags may contain, e.g., 5% to 15% each. Impurities in tin slags typically include CaO (5–20%), $SiO_2$ (10–40%), FeO (5–20%), $TiO_2$ (5–15%), $Al_2O_3$ (5–10%), $ZrO_2$ (1–5%), and various other minor elements and usually include significant thorium and uranium values.

A specific example of a feed material useful for the present invention are actual tantalum ore tailings, the residue analyses of which, as determined by neutron activation analysis (NAA), inductively coupled plasmaspectrophotometry (ICP), and wet chemistry techniques are shown in Table I. An X-ray diffraction analysis (XRD) of the tailings showed the prominent compounds to be $Ca_{12}Al_2Si_4(SO_4)_3F_{40}$ and $Ca_3Al_2(Ce)SO_4F_{13}$, with $CaF_2$ and $SiO_2$ also being detectable. Other elements in trace amounts typically are present also.

TABLE 1

| Element | Percent | Element | Percent |
|---------|---------|---------|---------|
| Al | 4.7 | Sc | 0.24 |
| Ca | 14.7 | Si | 2.0 |
| Ce | 0.95 | $SO_4$ | 3.6 |
| F | 32.7 | Ta | 1.59 |
| Fe | 1.02 | Ti | 1.99 |
| Mg | 1.05 | Th | 0.50 |
| Mn | 0.35 | U | 0.12 |
| Na | 1.96 | V | 0.11 |
| Nb | 1.68 | Zn | 0.02 |
| Ni | 0.06 | Zr | 1.78 |
| Pb | 0.05 | | |

The sludges remaining after HF digestion of the ores, slags or concentrates are primarily unreacted materials, insoluble fluoride salts, and hydrofluoric acid-containing digestion liquors. A typical sludge stream remaining after digest ion contains about 30% to 60% moisture and, on a dry-weight basis, up to about 3.6% tantalum, up to about 3.0% columbium, up to about 1% uranium, up to about 1% thorium, and up to about 40% fluorides. On dry basis, the sludge weight is about 25% to 75% of the initial input solids weight depending on the origin of the feed materials.

The following examples will further illustrate practice of certain embodiments of the invention, wherein all percentages are by weight unless otherwise specified and all metal concentrations are based on elemental weight thereof.

EXAMPLE A

Processing of Uranium-Contaminated Calcium Fluoride

A calcium fluoride sludge resulting from the treatment of the process effluent stream from a $UF_6$ production facility with lime was processed in accordance with the present invention, the stated component percentages or concentrations being approximate. The sludge consisted of 40% water and 60% solid material. The composition of the solid material was 90–95% calcium fluoride, 5% lime and trace metal hydroxides, and 1600 ppm U. The sludge was leached with a 5% excess of sulfuric acid and a 25% excess of boric acid. The purpose of the leach was to extract the fluoride and uranium from the sludge and leave a calcium sulfate leach residue that could be landfilled.

In carrying out the above, a quantity of 140 g of calcium fluoride sludge was digested in a solution of 105 g of concentrated sulfuric acid, 300 ml of water, and 38 g of boric acid for 3 hours at 90°–95° C. The digest solution was filtered and the calcium sulfate filter cake was washed with two 50 ml aliquots of water. The filter cake was dried at 105° C. and assayed for water and ppm uranium. The cake contained 43% water and 15 ppm (10 pCi/g) U on a dry weight basis. Following filtration, the digest liquor was diluted and analyzed. This liquor contained approximately 139 mg/L of U, 10 g/L of sulfate, and 6.68 g/L of boron as $H_3BO_3$. Based on these results, 99+% of the U was digested, 90% of the sulfuric acid was consumed, and 99+% of the boric acid was recovered.

EXAMPLE B

Benefaction of Ta/Nb Ore Residues

Tantalum and niobium ore residues containing, e.g., 1–2 wt % of each component may be benefited by the present process. Typically, the tantalum and niobium in the ore residues are contained in a refractive iron/manganese matrix. This, plus the fact that the metals are at low concentrations, makes direct processing economically unattractive. The present strong mineral acid/boric acid combination attacks the insoluble radionuclide fluorides and mobilizes them into the digest liquor where they can be extracted, or otherwise isolated, thereby providing a residue with markedly reduced radionuclide values. In addition, the residue is beneficiated in tantalum and niobium concentrations in that a large fraction of other components are efficiently solubilized into the digest liquor, leaving behind, in the residue, tantalum and niobium concentrations that are approximately 10-fold greater than in the starting material.

While sulfuric acid/boric acid may be used, the selection of nitric acid and boric acid is preferred when calcium and radium need to be removed from the ore residues. Nitric acid/boric acid combination is the preferred selection to provide a residue with lower radioactivity and higher tantalum and niobium values than normally achievable with sulfuric acid/boric acid combination. In this regard, in a pure acid system, some fraction of the tantalum and niobium in the fluoride-bearing residues will be mobilized to the digest liquor as fluoride complexes. The use of sulfuric acid alone mobilizes a large fraction of tantalum and niobium in some sludges, but only a minimal concentration of tantalum and niobium in others. Since boron reacts strongly with fluoride in the sludge, the tantalum and niobium cannot readily mobilize as soluble fluorides and therefore remain as insoluble compounds in the ore residue as a result of the present process.

Processing of Ta/Nb Ore Processing Residue

A sludge (wet residue) resulting from the digestion of a Ta/Nb ore in HF and sulfuric acid was processed in accordance with the present invention using a two-stage digest. The sludge contained approximately 52% water and the dried sludge (residue) consisted approximately of 20–25% F, 15% Ca, 6% Al, 5% Zr, 3% Ti, 2% Fe, 1% Ta, 1% Nb, 0.6% Mn, 0.4% Th, 0.2% U, 0.2% Sc, and contained 400 pCi/g Ra-226. The Ta and Nb were present in the sludge in a refractory iron/manganese containing matrix. The bulk of the remaining sludge components were present as insoluble fluoride species.

Because of the insolubility of the calcium and radium sulfate, nitric acid was selected as most appropriate for the aforesaid other mineral acid. In accordance with the present invention, 210 g of the raw sludge was digested in a two-stage, countercurrent, continuous fashion with 120 ml of concentrated nitric acid, 30 g of boric acid, and 300 ml of water. The digestion times and temperatures for each of the two stages were 4 hours and 80°–90° C., respectively. In typical countercurrent fashion, the digest residues left from the first stage were contacted with fresh digest solution in a second stage. The second digest solution was then used to contact the raw sludge. Residues from the first digest were transferred to the second digest vessel by filtering the digest leach solution and transferring the filter cake to the second digest vessel. Following the second digest, the second digest solution was filtered and the digest residues were washed with approximately 50 ml of 0.1 molar nitric acid. The wash solution was combined with the digest solution and both were transferred to the first digest vessel along with 210 g of raw sludge.

After completion of the second digest, the residues thereof were dried and assayed. These residues typically weighed approximately 5 grams and consisted of approximately 50% Ta/Nb oxides. Essentially 95% of the remaining sludge constituents were solubilized into the first digest liquor including the Sc, Th, U, and Ra-226. The combined digest and wash liquors counted about: 200 pCi/ml total uranium; 25 pCi/ml thorium; 70 pCi/ml radium—226; and contained 230 mg/L of scandium.

Similar results are obtained in separate runs conducted as above but employing various ones of the complexing materials added to the digest medium in place of the $H_3BO_3$.

An encapsulation of preferred technology as it relates specifically to tantalum and/or niobium recovery from residues which contain economically attractive amounts of either of these metals is as follows:

The process for recovering Ta and/or Nb values from highly fluorinated ore materials comprising;

(a) contacting said materials with an acid component comprising $HNO_3$ or $HCl$ or mixtures thereof, and $H_3BO_3$ wherein the $H_3BO_3$ to acid component molar ratio is from about 1/10 to about 1/1, (b) maintaining the temperature between about 55° C. and about 85° C., (C) continuing the reaction for a sufficient period to substantially solubilize the major portion of said materials and to substantially insolubilize all Ta and/or Nb values, and (d) separating the solids containing the Ta and/or Nb values from solution.

Preferably in the process the separated solids from step (d) are, subjected to a reducing environment such as hydrogen. Also preferred is the use of the nitric acid-boric acid combination.

EXAMPLE C

Uranium Extraction and Recovery from Calcium Fluoride Digest Liquors

The liquor and combined washes obtained from the digestion of calcium fluoride sludge illustrated in Example A were used in this experiment and contained approximately 130 mg/L total uranium as a solution approximately 0.4N in fluoroborate ion at a pH of about 0.5. It is noted that in carrying out the present process, the initial digest pH is typically between about 0.0 and about 3.0, and preferably is from about 0.5 to about 1.5. Extraction of the uranium was performed by using an iminodiacetate ion-exchange resin SR-5, manufactured by Sybron/Ionac Chemicals. Ten cc of SR-5 with standard particle size distribution −16+50 Standard U.S. Mesh were loaded into a laboratory column. This column was treated with 1M sulfuric acid and subsequently rinsed until the effluent had reached a pH of 2.6 The uranium-bearing digest solutions were adjusted to pH of 2.8 with 10N sodium hydroxide and fed to the column at an average flow-rate of four bed volumes (BV) per hour. The column effluent was periodically sampled and analyzed for total uranium by a laser induced phosphorescence method as described in an article by B. A. Bushaw, entitled "*Progress In Analytical Spectroscopy*", proceedings vol. 26, Oak Ridge Conference On Analytical Chemistry In Engineering Technology, Knoxville, Tenn. October 1983. Through fourteen BV of solution processed, the leakage of uranium in the effluent was <3% and through 30 BV of liquor processed, approximately 91% of uranium in the feed solution, i.e., 36.0 mg of radionuclide, was extracted by the SR-5.

Uranium was then recovered from the loaded laboratory column. For this recovery, the column was first rinsed with 20 ml of deionized water to displace uranium from the void volume. The elution of uranium from the ion-exchange resin was performed by passing a 2N nitric acid solution through the column and collecting the eluant in 20 ml increments at about 4 BV/hr. The total uranium analysis in the eluant fraction was performed by a laser induced phosphorescence method. Analysis of a total of eight BV of eluant collected showed that essentially 100% of the uranium values were stripped from the column.

Methods For Radiometric Analyses

For the analyses of radionuclides, two types of methods exist i.e., destructive and non-destructive techniques. For the destructive technique, the sample matrix is converted to a form where the target nuclide may be selectively isolated and analyzed. For the non-destructive technique, the sample matrix is assayed for target nuclides without destroying or converting the matrix.

Uranium was assayed in several ways. For the calcium fluoride testing, when uranium was in a solid matrix, this matrix was digested and the resulting digest solution was analyzed by kinetic phosphorescence. In this technique, a chemical is added to the liquid to complex with the uranium. This complex is excited with a laser which causes it to phosphoresce. The decay of the intensity of the phosphorescing species or complex is followed and plotted over time. Extrapolation of the curve to t=0 provides the concentration of the uranium. When liquids are analyzed, as from ion-exchange processing or in the mother liquor, the dye is added directly.

Thorium was measured by Inductively Coupled Plasma Spectroscopy (ICP). Thorium measurements in solids, e.g. digest residues, first requires complete digestion of the residue to produce a liquid, and the thorium analyses in the liquor is performed directly by ICP. Uranium in leach residues has also been measured by ICP following acid digestion of the residues.

Radium analyses were performed by gamma spectroscopy. In this non-destructive method, the gamma rays emitted from either the radium or from its daughter products are collected and assayed and then related to the total radium concentration. Pre-treatment of the sample prior to assay is not required by this measurement technique.

Other useful analytical methods include:
Metals—Atomic Adsorption or ICP;
Fluorides—Selective Ion Electrode;
Fluoroborates—Selective Ion Electrode or Gravimetric using lime addition;
Nitrates—Selection Ion Electrode.

Ionac SR-5 is a macroporous chelating resin based on iminodiacetic acid functionally for the selective recovery of heavy metal ions from waste treatment streams and process liquids. The resin is designed to stand up to the harsh conditions of waste and process applications. Resin attrition is minimal due to the rugged, second-generation macroporous polymer backbone and the very low (approximately 20%) reversible swelling. The general specifications of this resin are as follows:

| Polymer Structure | Styrene-Divinylbenzene Copolymer |
| --- | --- |
| Functional Groups | Iminodiacetic Acid |
| Physical Form | Moist Spherical Beads |
| Ionic Form (as shipped) | Sodium |
| Selective Copper Capacity (Na form) | 1.7 moles/l |
| Reversible Swelling (H to Na) | 20% (approx.) |
| Shipping Weight | 45 lbs/cu. ft (720 g/l) |
| Particle Size Distribution (wet) | |
| (U.S. Std. Mesh) | −16 + 50 |
| (Metric) | 0.3–1.2 mm |
| Effective Size (mm) | 0.47–0.53 |
| Uniformity Coefficient | 1.7 Maximum |
| Water Retention | 45–50% |
| pH Range (Stability) | 1–14 |
| Solubility | Insoluble in all common solvents |

Further details of this resin are found in the sales literature, 5 pages, of Sybron Chemicals Inc., of Birmingham, N.J., entitled IONAC Selective Metal Recovery.

EXAMPLE D

Recovery Of Fluorine Values As Aluminum Fluoride

Three processes for the preparation of high-quality aluminum fluoride from calcium fluoride leach liquors as prepared above, were developed. These processes follow the general flowsheet presented in FIG. 2. It is particularly noted that heretofore, aluminum trifluoride has been produced mainly by the reaction of HF with aluminum hydroxide, which process requires the very costly HF reactant as well as the extraordinary anti-corrosion equipment and handling precautions required for and associated with HF.

In the present process #1, aluminum is added as alumina trihydrate, $Al(OH)_3$, to leach liquor from which incidental or trace metallic impurities have been removed by precipitation with ammonium hydroxide. The $Al(OH)_3$ digestion is carried out at a temperature of from about 150° C. to about 195° C., preferably about 180° C. and a pressure of from about 180 to about 215 psi, preferably at about 200 psi for about 20–60 minutes, preferably about thirty minutes in a teflon bomb.

In the present process #2, after removal of incidental or trace metallic impurities from the leach liquor by hydroxide precipitation, aluminum sulfate is added to the leach (raffinate) liquor and the digestion carried out for about 2–8 hours, preferably for approximately 4 hours at about 90°–95° C. Ammonium hydroxide is added periodically throughout the digestion period to neutralize any free acid such as $H_2SO_4$ formed during the reaction of ammonium fluoroborate with aluminum sulfate.

In the present process #3, after removal of incidental or trace metallic impurities from the leach liquor by hydroxide precipitation, or other separation processes such as solvent extraction or ion exchange, a sufficient quantity of sulfuric acid is added to adjust the pH of the liquor to between about 1 and about 4, preferably in the 2 to 3 range. Aluminum hydroxide, preferably in stoichiometric amounts, but may be in, e.g., about 20% excess, as alumina trihydrate is added to this liquor and a digestion is carried out from about 3 to about 6 hours at from about 80° C. to about 97° C., preferably from about 90° C. to about 95° C. The resulting slurry is filtered to provide an aluminum fluoride trihydrate.

The following equations show the end chemical reactions for each process wherein, e.g., up to about 20% excess reactant may be employed, but wherein substantially stoichiometric quantities of the reactants are preferably employed.

Process #1

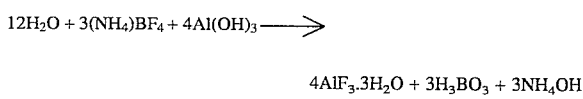

$$4AlF_3.3H_2O + 3H_3BO_3 + 3NH_4OH$$

Process #2

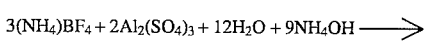

$$4AlF_3.3H_2O + 3H_3BO_3 + 6(NH_4)_2SO_4.$$

Process #3

In carrying out the above processes, the aluminum fluoride is filtered and washed with water to remove boric acid and sulfate contamination. The aluminum fluoride filter cake is then calcined to remove water and is then ground to meet particle-size specifications. The digestion liquor is treated with lime and the ammonium hydroxide recovered. The calcium sulfate resulting from this lime treatment is filtered and washed with water to remove boric acid contamination and the liquor and wash water then returned to the $CaF_2$ leaching process for reuse. It is noted that the extremely efficient recovery of the boric acid is a very valuable and unexpected aspect of these processes.

Process #1

A synthetic leach liquor was prepared to evaluate process #1. The leach liquor was prepared by adding 91.5 g of 48% fluoroboric acid, 7.73 g of boric acid, and 25 g of $(NH_4)_2SO_4$ to a 500 ml volumetric flask and diluting to 500 ml with demineralized water. This resulted in a synthetic leach liquor containing 1 molar fluoroboric acid, 50 g/L ammonium sulfate, and 0.25 molar boric acid which is typical of a calcium fluoride leach liquor. A 50 ml aliquot of the synthetic leach liquor was neutralized with approximately 3.3 ml of concentrated ammonium hydroxide to pH 7.0 This solution was placed in a 100 ml teflon digestion bomb and 5 g of aluminum hydroxide was added. Only 95% of the stoichiometric quantity of the aluminum hydroxide was added to insure that aluminum consumption went to completion. The teflon bomb was sealed and the contents were digested by placing the bomb in a microwave and heating for 30 minutes at 150° C., the pressure reaching about 40 psi. The bomb was then heated at 180° C. for another 30 minutes, the pressure reaching 130 psi. After cooling, the contents of the bomb were filtered, the filter cake was washed with approximately 50 ml of water and the cake dried at 105° C. After drying, the cake was analyzed to determine its aluminum and fluoride values. The analytical results showed that about 92% of the fluoride was recovered as aluminum fluoride trihydrate.

Process #2

An actual calcium fluoride leach liquor was utilized to evaluate the process #2. An aliquot of 920 ml of leach liquor containing 0.25 mole/L fluoroboric acid, 0.08 mole/L boric acid and 0.2 mole/L sulfuric acid was placed in a one L glass beaker and 87 g of $Al_2(SO_4)_3 \cdot 18H_2O$ was added and the solution stirred until all of the aluminum sulfate dissolved. The solution was adjusted approximately to a pH=8 with ammonium hydroxide and the beaker placed on a hot plate, stirred, and heated for 4 hours at 90°–95° C. The pH was periodically adjusted during the 4 hour digestion period with ammonium hydroxide to maintain a pH greater then 7.0. Following the digestion period, the solution was filtered and the filter cake was washed with approximately 50 ml of demineralized water to remove boric acid and ammonium sulfate contamination. After washing, the filter cake was dried at 105° C. and analyzed to determine its aluminum and fluoride values. The analytical results showed that the filter cake consisted of aluminum fluoride trihydrate.

An actual calcium fluoride leach liquor was utilized to evaluate the process #3. An aliquot of 500 ml of leach liquor containing 0.260 mole/L fluoroboric acid, 0.11 mole/L boric acid, and 0.11 mole/L sulfuric acid was treated with concentrated ammonium hydroxide to a pH of near 7 and stirred at ambient temperature for about 15 minutes. The resulting slurry, comprised of precipitated metal hydroxide impurities, was filtered and the resulting filter cake was washed with 100 ml of deionized water. The washwater was added to the filtrate to bring the total liquid volume up to 620 ml.

To this combined volume, concentrated sulfuric acid was added to adjust the solution pH to about 3. Following pH adjustment, a quantity of 15.1 grams of alumina trihydrate (manufactured by ALCOA, Point Comfort, Tex.) were added to the liquor plus washwater solution and heated for 6 hours at 90° C. This solution was filtered and the resulting filter cake was washed with 100 ml of deionized water. The filter cake was dried at about 105° C. and analyzed to determine its aluminum and fluoride values. The analytical results showed that the filter cake consisted of aluminum fluoride trihydrate with ≧90% recovery of fluoride values from solution.

In regard to the process designated item 10 on page 8, the following examples E–H will illustrate the same.

EXAMPLE E

Extraction and Recovery of Uranium, Thorium, Scandium, Zirconium

This example illustrates both the decontamination of process liquor by extracting uranium and thorium and the recovery of non-radioactive metals such as scandium and zirconium. A liquor from the digestion of Tantalum/Niobium Leach residues was analyzed and found to contain Uranium, thorium, scandium, zirconium, and titanium (see table below). A four-stage countercurrent extraction was performed by contacting ~180 ml of subject liquor with 50 ml of organic extractant, comprised of 5 v/o DEHPA*5 v/o TBP, 90 v/o kerosine. The 50 ml sample of fresh organic was added to stage 4 after each of the 5–180 ml aliquots were extracted in Stage 4. Following extraction, a 250 ml sample of pregnant organic was collected and contacted with 200 ml of 2M NaOH to strip metal values from the organic phase. Solids created in the strip solution were filtered and dried. The following Table summarizes the results for analysis of feed liquor, extracted liquor (raffinate), strip solids, and depleted strip solution.

**DEHPA is di-2(ethylhexyl)phosphoric acid. *See p.p. 13,14 and 27.

| Solution | Uranium | Thorium* | Scandium ppm | Zirconium ppm |
|---|---|---|---|---|
| Digest Liquor | 152 pCi/ml | 14 pCi/ml | 123 | 4,010 |
| Extracted Digest Liquor | <1 pCi/ml | <2 pCi/ml | <1 | 2,050 |
| Strip Solids | 36,434 pCi/g | 2,580 pCi/g | 35,213 | 269,900 |
| Strip Filtrate | 52 pCi/ml | <0.3 pCi/ml | <2 | <25 |

*Th-232 activity

The results indicated that uranium and thorium are quantitatively removed from digest liquor to provide a decontaminated raffinate, which can be further treated to produce decontaminated raffinate solids. Scandium values are also quantitatively extracted. Once removed by the extraction process, the metal constituents are efficiently recovered as a solid concentrate i.e. as strip solids by the stripping process. Scandium content is increased in the concentrate by a factor of 10 compared to its concentration in the leach residues. These strip solids may be sent to disposal as radioactive waste or treated further to recover metal values.

EXAMPLE F

Selective Extraction of Uranium and Thorium From Process Liquor

Amine extractants of the primary, tertiary and quaternary forms, are useful in selectively extracting uranium and thorium from digest liquors. For this example, a 10 v/o Aliquat 336 was made by combining 450 ml of kerosine, 50 ml Aliquat 336*, and 20 gm of tridecanol. A liquor from the digestion of tantalum and niobium leach residues was contacted for 2 minutes with an equal volume of Aliquat extractant prepared above. Three successive extractions or liquor were performed to demonstrate feasibility of the selective extraction. The following table indicates the results of the extraction:

*Aliquot 336 is tricaprylylmethylammonium chloride.

| Solution | Uranium pCi/ml | Thorium pCi/ml | Scandium ppm | Zirconium ppm |
|---|---|---|---|---|
| Digest Liquor | 234 | 27 | 110 | 6700 |
| Extracted Digest Liquor - 1st | 46 | 8 | 88 | 6145 |
| Extracted Digest Liquor - 2nd | 11 | 4 | 88 | 6355 |
| Extracted Digest | 7 | 2 | 98 | 6364 |

-continued

| Solution | Uranium pCi/ml | Thorium pCi/ml | Scandium ppm | Zirconium ppm |
|---|---|---|---|---|
| Liquor - 3rd | | | | |

The results indicate that uranium and thorium are chemically separated from scandium and zirconium, which remain principally in the digest liquor even following three sequential extractions. The decontaminated liquor, with uranium and thorium removed, can be submitted for further processing to extract a scandium product that contains substantially reduced radioactivity.

EXAMPLE G

Extraction of Uranium from Digest Liquor

A 30 ml sample of digest liquor from the first leach using the boric acid/hydrochloric acid system from the above example was contacted and vigorously agitated for 5 minutes in a 1:1 organic-to-aqueous ratio with two (2) different organic extractants to evaluate the efficiency of uranium recovery. The following table presents the results of these extraction tests.

| SOLVENT EXTRACTION RESULTS | | |
|---|---|---|
| Sample | mg/L Uranium | % U extracted |
| Feed Liquor | 1344 | 0.0 |
| Extracted Liquor (1-stage) D2EHPA/TBP/kerosene 5 v/o; 5 v/o; 90 v/o | 20.1 | >98.5 |
| Extracted Liquor (2-stages) TOPO/kerosene 0.05M | <1.0 | >99.0 |

Notes
D2EHPA = Di-(2-ethylhexyl) phosphoric acid
TBP = Tri-n-Butylphosphate
TOPO = Trioctylphosphine Oxide
Kerosene is the solvent for the extractants noted above The data indicate that uranium may be quantitatively extracted from the digest liquor by phosphate based extractants. This produces a uranium-free raffinate from which either impurities may be precipitated to form a non-radioactive landfill residue or magnesium and fluorine values may be recovered.

EXAMPLE H

Dissolution of Refractive Uranium-Contaminated Magnesium Fluoride Matrix

Co-current leaches were performed on uranium-contaminated magnesium fluoride both with and without boric acid to determine the efficiency of the digestion process. A 15 gram sample of magnesium fluoride produced from the greensalt reduction process and containing about 2 wt % depleted uranium (0.30 grams total uranium) was digested for about 4 hours at 90° C. in a solution containing 150 ml total solution that was 6 M HCL and 0.75 M boric acid. Another comparative test was carried out using the same conditions, except omitting the boric acid. Two (2) additional fresh acid leaches were performed successively under the same conditions on the filtered, residues from each test.

All residues were assayed for percent weight loss and uranium content and compared to the mass of the original feed material and its uranium content. The following summarizes the results of the test:

| RESIDUE LEACHING RESULTS | | | |
|---|---|---|---|
| Category | 1st Leach Residue | 2nd Leach Residue | 3rd Leach Residue |
| HCl Leach | | | |
| gms residue | 12.2 | 9.6 | Not generated |
| % feed dissolved (cum) | 18.7 | 36.0 | |
| gms U dissolved (cum) | 0.279 | 0.280 | |
| % U dissolved (cum) | 93.0 | 93.3 | |
| HCL/Boric Leach | | | |
| gms residue | 6.5 | 3.6 | 2.66 |
| % feed dissolved (Cum) | 56.6 | 74.0 | 82.3 |
| gms U dissolved (cum) | 0.285 | 0.287 | 0.289 |
| % U dissolved (cum) | 95.0 | 95.7 | 96.3 |

The above data indicate that the use of a strong mineral acid/boric acid digestion system provides a more efficient dissolution of the refractive $MgF_2$ matrix than a straight strong mineral acid system alone, and therefore, provides improved volume reduction for the initial radioactive feed materials.

The versatility of the present process in being able to recover metals employed in U or similar ore processing is of substantial significance. For example, magnesium fluoride is produced in the nuclear industry by the reduction of greensalt by magnesium to produce uranium metal. This is achieved by the following reaction:

$$2Mg+UF_4=2MgF_2+U.$$

The $MgF_2$ becomes contaminated with uranium during this reaction and the high heat of reaction produces a refractive fluoride matrix of difficult solvation. The present process as applied to $MgF_2$ is as follows:

$$2MgF_2+H_3BO_3+2\ H_2SO_4=2MgSO_4+HBF_4+3H_2O.$$

In this reaction the boric and sulfuric acids degrade magnesium fluoride matrix containing substantial uranium values. Uranium, once mobilized from the matrix, may be separated by the solvent extraction or ion exchange techniques described herein. The driving force for this reaction is the affinity or boric acid to complex the fluorides. Other mineral acids as previously described may be used with boric acid. The boric acid is then preferably regenerated with lime addition by the following reaction:

$$3CaO+2H_2O+HBF_4+MgSO_4=Mg(OH)_2+CaSO_4+2CaF_2+H_3BO_3.$$

In this regeneration, the magnesium hydroxide and calcium fluoride fall out as precipitates, which are separated from the liquid bearing the recycle boric acid.

A number of extractant recipes or organic phases useful in carrying out the present invention are disclosed in U.S. Pat. Nos.: 4,059,671; 4,102,976; 4,168,297; 4,197,195; 4,210,625; 4,305,912; 4,555,343; 4,587,106; 4,895,597; 5,039,496; and 5,158,603, the disclosures of which concerning such organic extractants or phases are hereby incorporated herein by reference.

The organophosphorus compounds, both neutral and acid, provide a wide range of solvent extraction organic phases. The acid hydrolysis products of tributylphosphate, i.e., the mono- and dibutylphosphoric acids, are particularly effective uranium extractants by themselves. In general, these reagents are compatible with a variety of water immiscible organic solvents, their solubility in aqueous phases can be made suitably low by use of sufficiently long alkyl chains, and they have useful stability under ordinary processing conditions. The general formulae for certain useful phosphorus containing extraction agents are given in Table I below and include the exemplary dialkylphosphoric acids, particularly di(2-ethylhexyl) phosphoric acid.

TABLE I

Organophosphorus Compounds

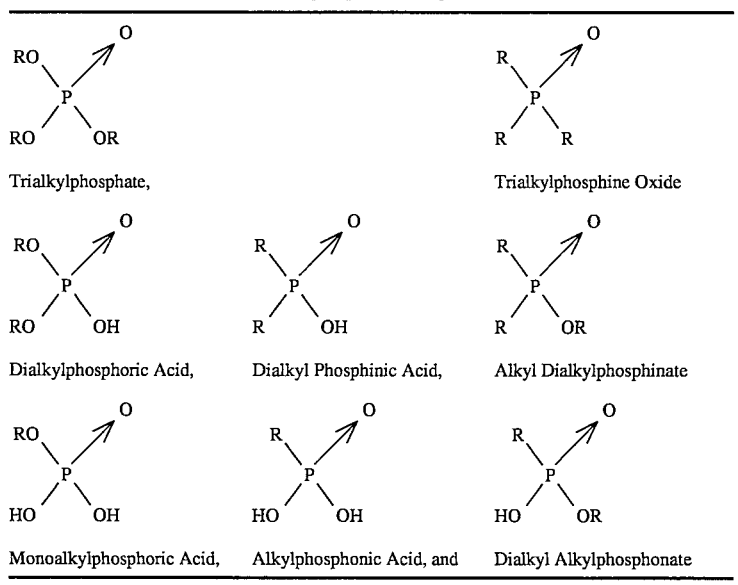

Trialkylphosphate, Trialkylphosphine Oxide

Dialkylphosphoric Acid, Dialkyl Phosphinic Acid, Alkyl Dialkylphosphinate

Monoalkylphosphoric Acid, Alkylphosphonic Acid, and Dialkyl Alkylphosphonate wherein R is preferably 4–20 carbon aliphatic.

The composition of typical feed materials to which the present process is applicable, in addition to those discussed on pages 12 and 13 of this specification of Examples A and B, include those listed below which show only a limited number of the most predominant elements which are given in PPM of a digest liquor:

|     | Sc   | Th  | U     | Al    | Fe   | Mg  | Mn   | Nb   | Ta   | Ti   | Zr   |
|-----|------|-----|-------|-------|------|-----|------|------|------|------|------|
| I   | 68.9 | 149 | 220   | 8323  | 3600 | 310 | 924  | 148  | 70.4 | 2474 | 3444 |
| II  | 176  | 307 | 89.21 | 4591  | 480  | 102 | 218  | 18.4 | 19.7 | 257  | 5504 |
| III | 230  | 253 | 341   | 8647  | 3943 | 400 | 1096 | 210  | 72.5 | 2808 | 4339 |
| IV  | 86   | 203 | 309   | 10500 | 4510 | 395 | 1320 | 244  | 74   | 2950 | 2490 |

The invention has been described in detail with particular reference to preferred embodiments thereof, but it will be understood that variations and modifications will be effected with the spirit and scope of the invention.

I claim:

1. The process for separating primary values of Ta and Nb from at least one of secondary values of U or Th, and from one or more secondary values selected from the group consisting of Sc, Zr, Ti or other values of non-radioactive metals, all of the aforesaid values being contained in highly fluorinated ore feed materials, said process comprising:

(a) contacting said feed materials with an aqueous, acidic, digest medium containing one or more complexing materials selected from the group consisting of $H_3BO_3$, or ions of group 2A, 3A, 4A, 5A, 6A, or 7A metals, Fe, B, Al or Si, and an acid component comprising $HNO_3$ or HCl or mixtures thereof, wherein the ratio of said reaction medium in liters (L) to said feed materials (Kg) on dry basis ranges from about 1/1 to about 20/1, the total concentrations of all of said acids being sufficient to solubilize said values at commercially acceptable rates, and wherein the molar ratio of said acid component to said complexing material ranges from about 20 to about 0.5;

(b) maintaining the temperature of said medium between about 55° C. and about 85° C.;

(c) reacting said materials in said medium for a sufficient period to solubilize the major portion of said secondary values and to leave said Ta and Nb values substantially insolubilized in said medium;

(d) separating the solids containing said Ta and Nb values from said medium to provide a digest liquor containing said solubilized secondary values;

(e) intimately contacting said liquor with an organic phase to transport at least major portions of said U and Th values thereinto from said liquor; and (f) separating said organic phase from said liquor to form a substantially non-radioactive raffinate.

2. The process of claim 1 having the additional step of treating said organic phase with suitable anion to strip therefrom as precipitates any of said secondary values which entered said organic phase.

3. The process of claim 2 wherein the precipitates are subjected to a reducing environment to form the metals.

4. The process of claim 1 wherein said acid component is nitric acid.

5. The process of claim 1 wherein said organic phase comprises a paraffinic hydrocarbon medium containing one or more components selected from the group consisting of phosphorus containing compounds, amine compounds or alcohols.

6. The process of claim 1 wherein said organic phase comprises aliphatic substituted phosphoric acid and paraffinic hydrocarbon.

7. The process of claim 6 wherein said organic phase further includes tributyl phosphine, and wherein the percentage by volume of each of the substituted phosphoric acid and the tributyl phosphine in the organic phase is from about 2 to about 15.

8. The process of claim 7 wherein said substituted phosphoric acid is bis-2-ethylhexyl phosphoric acid.

9. The process of claim 1 wherein secondary values of Sc and Zr are present in the feed materials, wherein said organic phase comprises paraffinic hydrocarbon and from about 2 to about 20% by volume of a quaternary amine compound, and from about 1 to about 15% by volume of alcohol, and wherein said Sc and Zr values substantially remain in said raffinate after the extraction.

10. The process for isolating at least one of the primary values of Ta or Nb, at least one of the secondary values of U or Th, and at least one of Sc, Zr or Ti from highly fluorinated ore materials comprising:

(a) contacting said materials with an aqueous, acidic digest medium containing $H_3BO_3$ and an acid component comprising $H_2SO_4$, $HNO_3$ or HCl or mixtures thereof, wherein the molar ratio of the $H_3BO_3$ to said acid component is from about 1/10 to about 1/1;

(b) maintaining the temperature of said medium between about 55° C. and about 85° C.;

(c) reacting said materials with said medium for a sufficient period to substantially solubilize the major portion of said secondary values and to leave the Ta or Nb values substantially insolubilized;

(d) separating the solids containing the Ta or Nb values from solution to provide a digest liquor containing said secondary values;

(e) intimately contacting said liquor with an organic phase containing a quaternary amine to transport at least major portions of said U and Th values into said organic phase from said liquor and to leave other secondary values in solution in said liquor;

(f) separating The organic phase from said liquor to form a substantially non-radioactive raffinate containing said other secondary values; and (g) separating said other secondary values from said raffinate.

11. The process of claim 10 having the additional step of treating said organic phase with suitable anion to strip therefrom as precipitates said secondary values which entered said organic phase.

12. The process of claim 11 wherein the precipitates are subjected to a reducing environment.

13. The process of claim 10 wherein values selected from Sc or Zr are present in said ore materials, and wherein these values remain in said raffinate after extraction, and wherein these values are isolated from said raffinate in step (g).

14. The process of claim 10 wherein said acid component is nitric acid.

15. The process of claim 1 wherein said organic phase comprises a paraffinic hydrocarbon medium containing one or more components selected from phosphorus containing compounds, amine compounds or alcohols.

16. The process of claim 1 wherein said extractant comprises paraffinic hydrocarbon, from about 2 to about 20% by volume of a quaternary amine compound, and from about 1 to about 15% alcohol.

17. The process of claim 1 wherein said secondary metal values include Sc and Zr, and wherein said organic phase selectively extracts U and Th from said liquor whereby Sc and Zr of greatly diminished radioactivity pollution levels can be recovered from said liquor.

18. The process for separating U or Th values from values of at least one other metal selected from Ta, Nb, Sc, Zr, Ti and Mg, wherein all of said values are contained in a difficult soluble matrix of highly fluorinated feed materials selected from U or Th bearing ores or the processing products, processing intermediates, or processing residues thereof, said method comprising:

(a) contacting said feed materials with an aqueous, acidic, digest medium containing $H_3BO_3$ and an acid component containing one or more acids selected from $H_2SO_4$, $HNO_3$, HCl or mixtures thereof, wherein the molar ratio of the $H_3BO_3$ to said acid component is from about 1/10 to about 1/1, wherein the ratio of said reaction medium in liters (L) to said feed materials (Kg) on dry basis ranges from about 1/1 to about 20/1, the total concentrations of all of said acids being sufficient to solubilize said values at commercially acceptable rates, and wherein the molar ratio of said acid component to said boric acid charged to said medium ranges from about 20 to about 0.5;

(b) maintaining the temperature of said medium between about 55° C. and about 85° C.;

(c) reacting said materials in said medium for a sufficient period to solubilize essentially all of said U and Th values;

(d) separating any remaining solids from said medium to provide an aqueous, acidic digest liquor containing said solubilized U or Th values and any solubilized other metal values;

(e) intimately contacting said liquor with an organic phase to transport thereinto substantially all of said U or Th values and any of said solubilized other metal values which are extracted by said organic phase from said liquor; and (f) separating said organic phase containing at least said U or Th values from said liquor containing any of said solubilized other metal values which were not extracted into said organic phase to form a substantially non-radioactive, aqueous, acidic raffinate containing said solubilized non-extracted other metal values.

19. The process of claim 18 having the additional step (g) of treating said organic phase and said raffinate with suitable anion to strip therefrom as precipitates the of said values contained therein.

20. The process of claim 19 wherein said acid component is predominantly $H_2SO_4$, wherein $HBF_4$ is generated during step (c), wherein Mg is present as said other metal values, wherein said raffinate is treated with CaO, and wherein said Mg values precipitate out of the treated raffinate as $Mg(OH)_2$, and $H_3BO_3$ is regenerated in solution in the raffinate.

21. The process of claim 20 having the additional step (h) which comprises isolating by filtration said $H_3BO_3$ in solution from the solids precipitated in step (g).

22. The process of claim 19 wherein said organic phase contains an amine containing extractant, wherein Sc is present as a metal value in said feed materials, and wherein said U and Th values are extracted by said organic phase and thereby isolated from said Sc.

23. The process of claim 1 wherein said complexing materials are selected from the group consisting of $H_3BO_3$, Al, salts of Al, Fe, ferric salts or $SiO_2$.

* * * * *